US012461879B2

(12) United States Patent
Mirajkar et al.

(10) Patent No.: US 12,461,879 B2
(45) Date of Patent: Nov. 4, 2025

(54) SPANNED VIRTUAL DISK INITIALIZATION WITH DYNAMIC NUMBER OF STORAGE CONTROLLERS

(71) Applicant: DELL PRODUCTS L.P., Round Rock, TX (US)

(72) Inventors: Abhijit Mirajkar, Bangalore (IN); Rajeev Ranjan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 250 days.

(21) Appl. No.: 18/459,753

(22) Filed: Sep. 1, 2023

(65) Prior Publication Data

US 2025/0045237 A1 Feb. 6, 2025

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............... G06F 13/4221; G06F 2213/0026
See application file for complete search history.

(56) References Cited

U.S. PATENT DOCUMENTS

| 9,870,162 | B2 | 1/2018 | Kundu et al. |
| 10,089,042 | B2 | 10/2018 | Khande et al. |
| 10,540,108 | B2 | 1/2020 | Krishna et al. |
| 2016/0077858 | A1* | 3/2016 | Hunter ............... G06F 13/4221 710/104 |
| 2017/0060415 | A1 | 3/2017 | Vajravel |
| 2017/0269857 | A1* | 9/2017 | Kundu ................. G06F 3/0689 |
| 2017/0293448 | A1* | 10/2017 | Bolen .................... G06F 3/061 |
| 2018/0307500 | A1* | 10/2018 | Miao ..................... G06F 3/0659 |
| 2021/0294615 | A1* | 9/2021 | Xiang ................ G06F 13/4282 |

* cited by examiner

*Primary Examiner* — Nimesh G Patel
(74) *Attorney, Agent, or Firm* — Larson Newman, LLP

(57) ABSTRACT

An information handling system generates a tree of peripheral component interconnect devices of the information handling system, and determines a count of storage controllers supported by a storage miniport driver based on the tree of the peripheral component interconnect devices. If a list of uninstalled miniport drivers is not empty, then the system deducts a number of the uninstalled miniport drivers in the list from the count of the storage controllers resulting in a final count of the storage controllers that are supported by the storage miniport driver.

20 Claims, 4 Drawing Sheets

SPANNED VIRTUAL DISK INITIALIZATION WITH DYNAMIC NUMBER OF STORAGE CONTROLLERS

FIELD OF THE DISCLOSURE

The present disclosure generally relates to information handling systems, and more particularly relates to spanned virtual disk initialization with a dynamic number of storage controllers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system generates a tree of peripheral component interconnect devices of the information handling system, and determines a count of storage controllers supported by a storage miniport driver based on the tree of the peripheral component interconnect devices. If a list of uninstalled miniport drivers is not empty, then the system deducts a number of the uninstalled miniport drivers in the list from the count of the storage controllers resulting in a final count of the storage controllers that are supported by the storage miniport driver.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
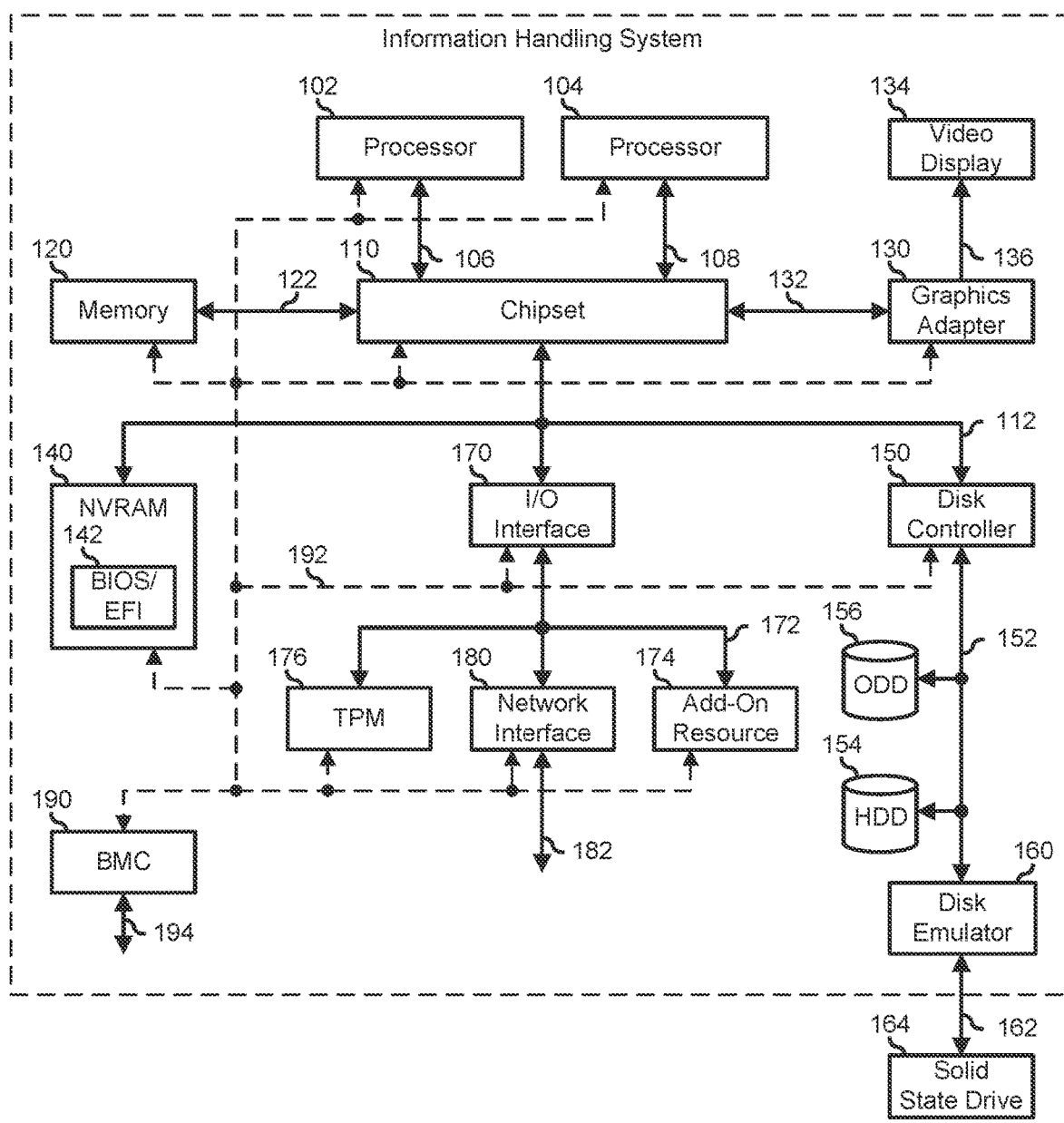
FIG. 1 is a block diagram of an information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive (ODD) 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to an HDD 154, to an ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, an non-volatile memory express (NVMe) interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include a $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a RedfishR interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus, BMC 190 can communicate with the management system via network interface 194 while the resources of information handling system 100 are powered off. Information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill in the art will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display. In addition, each of the storage devices can include one or more physical drives, which is a hardware component of a storage device.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

During initialization of an information handling system that is configured with a software-based redundant array of independent drives (RAID) solution, each virtual disk may be reconstructed using RAID configuration data stored in each physical storage device. The virtual disk is what is visible to the operating system not the physical storage device. Any missing or failed physical drive from the RAID configuration data may cause an affected virtual disk to be either reported as degraded or failed and in turn may cause data loss. Because with RAID solutions physical storage devices are typically exposed to the operating system, as a virtual disk with may include a boot volume, a failed or degraded virtual disk may also cause the information to fail to boot to the operating system. Thus all physical storage devices participating in a virtual disk configuration should be available and in a normal state before determining the virtual disk state, such as whether it is in a normal, degraded, or failed state.

In a software-based RAID solution with a variable number of storage controllers, the software-based RAID solution may determine how many of the physical storage devices are associated with the virtual disk and whether the physical storage devices are available and in a normal state. To accomplish this, the operating system may send a discovery and initialization operating system call to each storage controller or host bus adapter associated with a physical storage device. For example, the Windows operating system may send an operating system call "FindAdapter" to each storage controller or host bus adapter to determine whether the storage controller or the host bus adapter is supported.

If the virtual disk creation process is started before the last FindAdapter operating system call is received by a miniport driver, completed, and returned to the operating system, the virtual disk creation process may fail resulting in a degraded or failed status. To avoid this scenario, a driver receiving the FindAdapter operating system call needs to know the number of times it should receive the FindAdapter operating system call before the virtual disk creation process is started.

However, generally the number of storage controllers in an information handling system is not fixed. For example, a user may add or remove a physical storage device. This poses a challenge to the driver, as the driver does not know how many physical storage devices should be used in creating the virtual disk. Accordingly, the driver does not know which operating call it should treat as the last FindAdapter operating system call so that it can start to initiate the virtual disk creation process. In addition, if the boot disk is not exposed to the operating system within a timeframe, then the operating system may fail to boot. To address these and other concerns, the present disclosure provides a system and method to determine how many physical storage devices can be used for virtual disk initialization.

Figure 2:
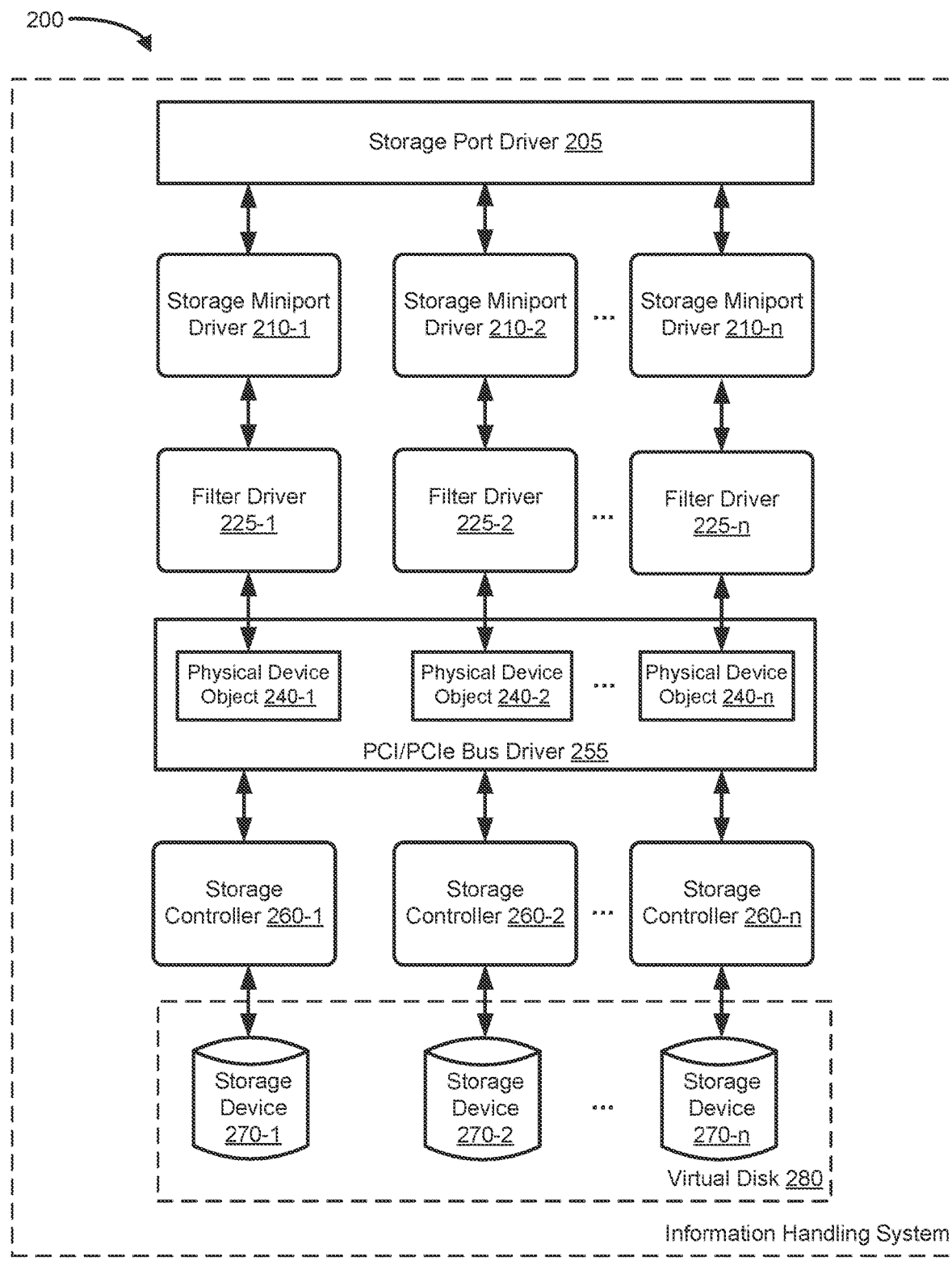
FIGS. 2-3 are block diagrams of an information handling system configured for a spanned virtual disk initialization with a dynamic number of storage controllers, according to an embodiment of the present disclosure.

FIG. 2 shows an information handling system 200 configured for a spanned virtual disk initialization with a dynamic number of storage controllers. Information handling system 200, which is similar to information handling system 100 of FIG. 1, includes a storage port driver 205, storage miniport drivers 210-1 through 210-n, filter drivers 225-1 through 225-n, a PCI/PCIe bus driver 255, storage controllers 260-1 through 260-n, and storage devices 270-1 through 270-n. Storage controllers 260 may be similar to disk controller 150 while storage devices 270 may be similar to ODD 156, HDD 154, or SSD 164 of FIG. 1. PCI/PCIe bus driver 255 may be used to connect a device or component to a motherboard of information handling system 200.

Storage controllers 260 may be connected to or a part of storage devices 270. For example, storage controller 260-1 may be connected to or a part of storage device 270-1. Similarly, storage controller 260-2 may be connected or a part of storage device 270-2, and so on. Storage devices 270 may be SCSI storage devices, PCI/PCIe storage devices, or similar. In particular, storage devices 270 may be NVMe SSDs or similar. The components of information handling system 200 may be implemented in hardware, software, firmware, or any combination thereof. The components shown are not drawn to scale and information handling system 200 may include additional or fewer components. In addition, connections between components may be omitted for descriptive clarity.

Storage port driver 205 is provided by the operating system and may be configured to translate a command from a higher level driver, such as a storage class driver, into a system-defined SCSI request block (SRB) before sending it to the next lower driver, such as storage miniport drivers 210. Storage port driver 205 may be a SCSI port driver, a storport driver, or similar. Storage miniport drivers 210 which may be a SCSI miniport driver, a storport miniport driver, a software RAID driver, or similar may be configured to work with storage port driver 205 such as to set up and operate one or more RAID arrays on information handling system 200.

Storage miniport drivers 210 are typically provided by a manufacturer of a software RAID application. For example, storage miniport drivers 210 may be configured to create, manage, and/or control a virtual disk 280 that is provided across storage devices 270. In addition, storage miniport drivers 210 may be configured to identify whether virtual disk 280 is attached to information handling system 200, to read and write data from virtual disk 280, or to perform other storage operations. Storage miniport drivers 210 may also be configured to receive one or more operations in a predetermined format and translate the operations into one or more commands to direct storage controllers 260 to perform the operations on virtual disk 280 or one or more storage devices 270.

Virtual disk 280 represents a storage array that is in conformance with a RAID storage array type, such as RAID 1 array that mirrors a common set of data on storage devices 270-1 through 270-n, of the striping RAID types, such as RAID 2, RAID 3, RAID 4, RAID 5, or RAID 6 that stripes data across the storage devices, or another type of RAID, such as a hybrid RAID array that both stripes and mirrors data on the storage devices, such as RAID 10, as needed or desired. As such, storage miniport driver 210 may operate to partition storage devices 270-1 through 270-n as necessitated by a particular RAID type desired, wherein storage devices 270 are physical storage devices.

At power on, storage port driver 205 may perform a discovery and initialization process of storage controllers 260 via storage miniport drivers 210. During the process, an operating system call may be used to initialize storage controllers 260 or host bus adapters, wherein each storage controller or host bus adapter is associated with one of storage devices 270. In particular, the operating system call may be used to determine whether the storage controller or the host bus adapter is supported by the software RAID application and thus by storage miniport drivers 210. After successfully initializing the storage controller or host bus adapter, the operating system call may return information associated with that storage controller or host bus adapter which may be used to connect with a storage controller.

After successfully connecting with the storage controller, RAID configuration data can then be stored in the physical storage device associated with the initialized storage controller or host bus adapter. For example, if the virtual disk is composed of three physical storage devices, then there will be three FindAdapter operating system calls and then each of the physical storage devices would store the RAID configuration data. During the initialization of the virtual disk, this RAID configuration information is read before initiating the virtual disk creation process. Thus, the operating system call may be performed n-number of times based on the number of storage devices 270 associated with virtual disk 280.

This may be performed to determine that storage devices 270 are available and functional before creating virtual disk 280. In particular, virtual disk 280 may not be created until storage controllers 260 are discovered and initialized. However, because storage port driver 205 and/or storage miniport drivers 210 do not know how many physical storage devices are associated with virtual disk 280, a timer may be used to allow completion of the operating system call. Thus, there is a risk of experiencing a timeout condition during the discovery and initialization process which can lead to boot failure. In some embodiments, creating virtual disk 280 prematurely, such as before the discovery and initialization of storage controllers 260 may be a fatal condition causing information handling system 200 to fail to boot or to crash. In some instances, there may also be data loss.

An operating system, like Windows® operating system, may have a layered driver architecture, such as depicted herein, where one driver is stacked on top of another, and requests like the operating system call are passed to the top of the stack which then each driver passes to the one below it. There is a provision to insert a custom driver in this stack to assist the functionality of a particular driver. The driver getting inserted in the stack is called a filter driver, such as filter drivers 225. In this scenario, filter drivers 225 may be used to determine the number of physical storage devices associated with the virtual disk and provide that information to storage miniport drivers 210. Thus, mitigating the issue discussed above. To accomplish this, upon loading an instance of filter drivers 225 may enumerate a PCI/PCIe device tree. For example, an instance of filter drivers 225, referred to herein as filter driver 225, may discover storage controllers 260 connected to the information handling system. Each of the PCI/PCIe devices may be associated with one or more device objects, such as a physical device object and a functional device object. Based on this, the instance may then identify physical device objects associated with storage controllers 260 in PCI/PCIe device tree.

Filter driver 225 may then identify a device identifier associated with each of the physical device objects. Based on the device identifier, filter driver 225 may determine whether the device identifier is supported by storage miniport drivers 210. For example, filter driver 225 may compare the device identifier to a list of device identifiers that is supported by the software RAID application and/or storage miniport drivers 210. Filter driver 225 may maintain a counter of the devices that are supported. For example, filter driver 225 may increment the counter each time it determines that the device identifier associated with the physical device object is supported by the software RAID application and/or storage miniport drivers 210. Otherwise, filter driver 225 may proceed to process the next physical device object in the PCI/PCIe device tree to identify its device identifier or other information. Filter driver 225 may perform this process for each of the physical device objects in the PCI/PCIe device tree.

After processing the physical device objects, filter driver 225 may pass the count to storage miniport driver 210 by forming a SCSI request block. Thus, instead of using a timer, storage miniport drivers 210 may instead wait for the count passed by filter driver 225. Storage miniport drivers 210 may compare the count to the number of FindAdapter operating system calls it received and determines whether the count matches the total number of FindAdapter operating system calls it received. When the count matches, storage miniport drivers 210 may then proceed to read the RAID configuration data stored in storage devices 270 and initiates the creation of virtual disk 280. Although examples herein refer to the FindAdapter operating system call, one of skill in the art will appreciate that a similar operating system call may be used without limiting the present disclosure.

A job associated with the functions of filter driver 225 described above may be performed by one instance of filter driver 225. The instance of filter driver 225 that performed the job may set a flag to true to indicate that the job has been completed. The flag may be located in a global data structure or context that is shared with other instances of filter driver 225. Prior to performing the aforementioned job, filter driver 225 may check the flag to determine whether the job has been completed. If the job has been completed the other instance(s) of the filter driver may not need to do anything.

Figure 3:
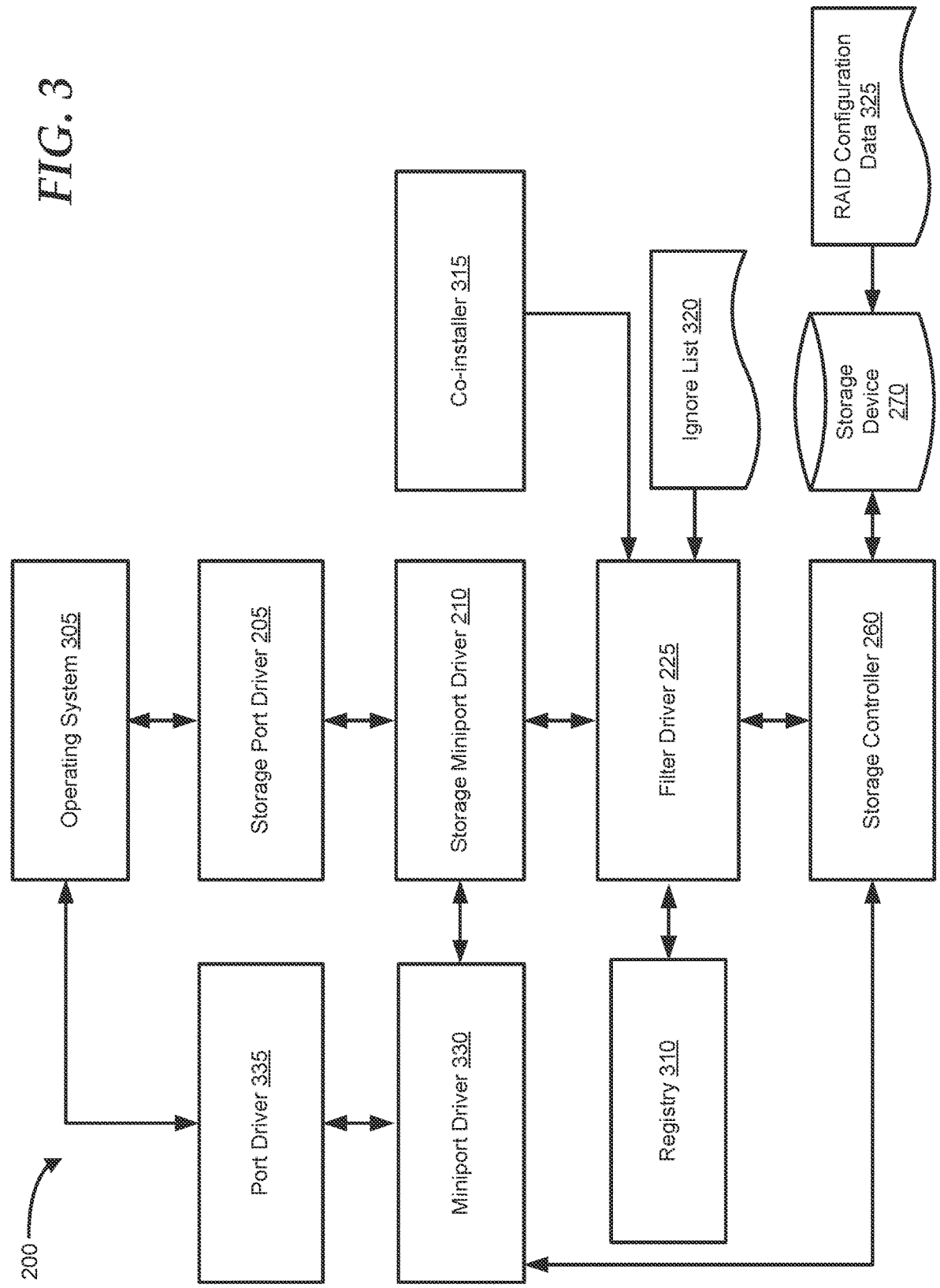

FIG. 3 shows information handling system 200 in greater detail. Information handling system 200 further includes an operating system 305, a registry 310, a co-installer 315, and a miniport driver 330. RAID configuration data 325 may be stored in each one of storage devices 270 after initialization of its corresponding storage controllers 260. Miniport driver 330 may be one of several drivers configured to communicate, manage, and/or control storage controllers 260 or the host bus adapter. A port driver 335 may be used by operating system 305 to communicate with a miniport driver 330. For example, miniport driver 330 may be an inbox driver, a mailbox driver, etc. Similar to FIG. 2, the components of information handling system 200 presented herein may be implemented in hardware, software, firmware, or any combination thereof. The components shown are not drawn to scale and information handling system 200 may include additional or fewer components. In addition, connections between components may be omitted for descriptive clarity.

In one embodiment, there may be an instance when a user installs a different driver to replace one or more miniport drivers of information handling system 200. For example, the user may replace miniport driver 330 and/or one of storage miniport drivers 210. During the next boot process of information handling system 200, filter driver 225 may count the number of storage controllers 260. However, the count may be a mismatch with the actual number of storage controllers and/or physical storage devices available for the creation of virtual disk 280. For example, if storage miniport driver 210 is replaced with miniport driver 330, then storage miniport driver 210 may not receive the operating system call for that storage controller. Thus, the count of storage controllers or host bus adapters managed by storage miniport driver 210 may not be accurate.

To address this issue, co-installer 315 may be used to keep track of miniport driver installation and uninstallation. Co-installer 315 may be a vendor-supplied user mode service component that is invoked by the operating system during the installation or uninstallation of a PCI/PCIe device or a miniport driver, such as miniport driver 330 and storage miniport driver 210. An ignore list 320 may also be maintained for filter driver 225, wherein ignore list 320 may be a list of storage controllers that should not be counted by filter driver 225. For example, ignore list 320 may be a list of uninstalled miniport drivers, such as storage miniport driver 210. Filter driver 225 may store ignore list 320 in registry 310 to retain the information between reboots.

A PCI/PCIe device is identified using bus/device/function (BDF) information. Co-installer 315 may be configured to detect the installation and uninstallation of a PCI/PCIe device and/or an instance of a miniport driver. During the installation or uninstallation of a PCI/PCIe device and/or the miniport driver instance associated with a storage controller, co-installer 315 may pass the BDF information associated with the storage controller to filter driver 225.

It is to be noted that only the BDF information may not be sufficient to track the controller having a different miniport driver installed, as the user may move the storage controller to a different slot. In this case, the BDF information may change but this particular miniport drive should still be ignored. To account for this, filter driver 225 may need to use the serial number of the associated storage controller to uniquely identify the storage controller. The serial number however is not accessible by co-installer 315. Thus, the BDF information may be used as a placeholder until filter driver 225 gets the serial number associated with the BDF information.

For every BDF information that filter driver 225 may get from co-installer 315, filter driver 225 may submit an SRB to the miniport driver instance associated with that BDF information. Once the miniport driver instance completes the initialization and responds with the serial number, filter driver 225 prepares a triplet identifier that includes a vendor identifier, a device identifier, and a serial number of the storage controller. Filter driver 225 may add this triplet identifier in ignore list 320 if co-installer 315 indicates that the miniport driver for the storage controller is getting uninstalled. Filter driver 225 may remove the triplet identifier if co-installer 315 indicates that the miniport driver for the storage controller is getting installed. During the boot process, after filter driver 315 has counted the supported number of storage controllers, filter driver 225 may read ignore list 320 from registry 310. Filter driver 225 may then deduct from the count of the supported storage controllers, the number of triplet identifiers in ignore list 320 before passing a final count to storage miniport driver 210.

Those of ordinary skill in the art will appreciate the configuration, hardware, and/or software components of information handling system 200 depicted in FIG. 2 and FIG. 3 may vary. For example, the illustrative components within information handling system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

As used herein, a hyphenated form of a reference numeral refers to a specific instance of an element and the un-hyphenated form of the reference numeral refers to the collective or generic element. Thus, for example, storage miniport driver "210-1" refers to an instance of a widget class, which may be referred to collectively as storage miniport drivers "210" and any one of which may be referred to generically as a storage miniport driver "210."

Figure 4:
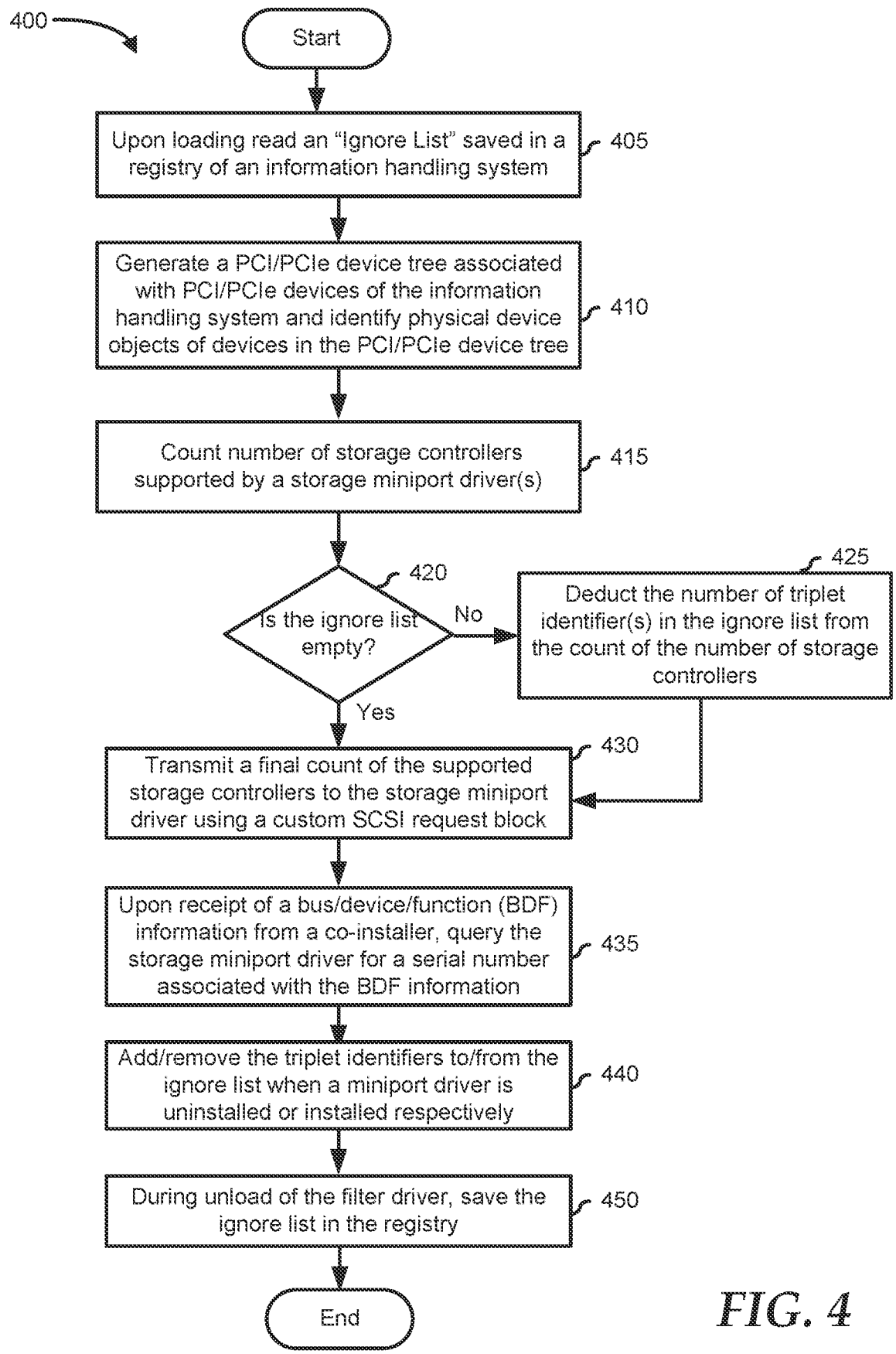
FIG. 4 is a flowchart illustrating a method for a spanned virtual disk initialization with a dynamic number of storage controllers, according to an embodiment of the present disclosure.

FIG. 4 illustrates a method 400 for a spanned virtual disk initialization with a dynamic number of storage controllers. Method 400 may be performed by one or more components of information handling system 200 of FIG. 2 and FIG. 3. However, while embodiments of the present disclosure are described in terms of information handling system 200, it should be recognized that other information handling systems may be utilized to perform the described method. One of skill in the art will appreciate that this flowchart explains a typical example, which can be extended to advanced applications or services in practice.

Method 400 typically starts at block 405, wherein upon loading of a filter driver, the filter driver may read an ignore list that has been saved in a registry of the information handling system. The filter driver may be loaded during the boot process. The method may proceed to block 410, where the filter driver may generate a PCI/PCIe device tree by enumerating PCI/PCIe devices associated with the information handling system. In addition, the filter driver may identify physical device objects of the devices in the PCI/PCIe device tree. The method may proceed to block 415, where the filter driver may count the number of storage controllers of the information handling system that are supported by the storage miniport driver(s).

The method may proceed to decision block 420, where the filter driver may determine whether the ignore list from the registry is empty. If the ignore list is empty, then the "YES" branch is taken, and the method proceeds to block 430. If the ignore list is not empty, then the "NO" branch is taken, and the method proceeds to block 425. At block 425, the filter driver may deduct the number of triplet identifiers in the ignore list from the count of the number of storage controllers supported by the storage miniport driver(s). At block 430, the filter driver may transmit a final count of the supported storage controllers to the storage miniport driver(s). The final count may be the count of the storage controllers in block 415 if the ignore list is empty. The final count may be equal to the count of the number of controllers in block 415 less the number of triplet identifiers in the ignore list from the registry.

The method may proceed to block 435 where the filter driver upon receipt of BDF information from a co-installer, may query the storage miniport driver for a serial number associated with the BDF information. The co-installer may transmit the BDF information when a miniport driver is installed or uninstalled. The method may proceed to block 440, where the filter driver may add a triplet identifier to the ignore list when a miniport driver, such as a storage miniport driver or another type of miniport driver is uninstalled. The filter driver may remove a triplet identifier from the ignore list when a miniport driver, such as a storage miniport driver or another type of miniport driver is installed. The method may proceed to block 450 where during the unloading process of the filter driver, the filter driver may save the ignore list in the registry. The filter driver may be unloaded when the information handling system is powered off, put in sleep mode, or similar.

Although FIG. 4 shows example blocks of method 400 in some implementations, method 400 may include additional blocks, fewer blocks, different blocks, or differently arranged blocks than those depicted in FIG. 4. Those skilled in the art will understand that the principles presented herein may be implemented in any suitably arranged processing system. Additionally, or alternatively, two or more of the blocks of method 400 may be performed in parallel. For example, block 430 and block 435 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   generating, by a processor, a tree of peripheral component interconnect devices of an information handling system;
   determining a count of storage controllers supported by a storage miniport driver of the information handling system based on the tree of the peripheral component interconnect devices;
   if a list of uninstalled miniport drivers is not empty, then deducting a number of the uninstalled miniport drivers in the list from the count of the storage controllers resulting in a final count of the storage controllers that are supported by the storage miniport driver; and
   transmitting the final count of the storage controllers to the storage miniport driver.

2. The method of claim 1, further comprising identifying a physical device object associated with each of the peripheral component interconnect devices.

3. The method of claim 1, further comprising reading the list saved in a registry of the information handling system.

4. The method of claim 1, further comprising saving the list to a registry of the information handling system during unloading of a filter driver.

5. The method of claim 1, further comprising adding an identifier of a miniport driver to the list when the miniport driver was uninstalled from the information handling system.

6. The method of claim 1, further comprising removing an identifier of a miniport driver from the list when the miniport driver was installed in the information handling system.

7. The method of claim 1, further comprising determining a serial number of a miniport driver that was uninstalled from the information handling system.

8. An information handling system, comprising:
   a processor; and
   a memory storing instructions that when executed causes the processor to perform operations including:
   generating a tree of peripheral component interconnect devices of the information handling system;
   determining a count of storage controllers supported by a storage miniport driver based on the tree of the peripheral component interconnect devices;
   if a list of uninstalled miniport drivers is not empty, then deducting a number of the uninstalled miniport drivers in the list from the count of the storage controllers resulting in a final count of the storage controllers that are supported by the storage miniport driver; and
   transmitting the final count of the storage controllers to the storage miniport driver.

9. The information handling system of claim 8, wherein the operations further comprise identifying a physical device object associated with each of the peripheral component interconnect devices.

10. The information handling system of claim 8, wherein the operations further comprise reading the list saved in a registry of the information handling system.

11. The information handling system of claim 8, wherein the operations further comprise saving the list to a registry of the information handling system during unloading of a filter driver.

12. The information handling system of claim 8, wherein the operations further comprise adding an identifier of a miniport driver to the list when the miniport driver is uninstalled from the information handling system.

13. The information handling system of claim 8, wherein the operations further comprise removing an identifier of a miniport driver to the list when the miniport driver is installed in the information handling system.

14. The information handling system of claim 8, wherein the operations further comprise determining a serial number of a miniport driver that was uninstalled from the information handling system.

15. A non-transitory computer-readable medium to store instructions that are executable to perform operations comprising:
   generating a tree of peripheral component interconnect devices of an information handling system;
   determining a count of storage controllers supported by a storage miniport driver of the information handling system based on the tree of the peripheral component interconnect devices;
   if a list of uninstalled miniport drivers is not empty, then deducting a number of the uninstalled miniport drivers in the list from the count of the storage controllers resulting in a final count of the storage controllers that are supported by the storage miniport driver; and
   transmitting the final count of the storage controllers to the storage miniport driver.

16. The non-transitory computer-readable medium of claim 15, wherein the operations further comprise identifying a physical device object associated with each of the peripheral component interconnect devices.

17. The non-transitory computer-readable medium of claim 15, wherein the operations further comprise reading the list saved in a registry of the information handling system.

18. The non-transitory computer-readable medium of claim 15, wherein the operations further comprise saving the list to a registry of the information handling system during unloading of a filter driver.

19. The non-transitory computer-readable medium of claim 15, wherein the operations further comprise adding an identifier of a miniport driver to the list when the miniport driver is uninstalled from the information handling system.

20. The non-transitory computer-readable medium of claim 15, wherein the operations further comprise removing an identifier of a miniport driver from the list when the miniport driver is installed in the information handling system.

\* \* \* \* \*